Oct. 30, 1923.

H. B. TAYLOR

ELECTRICAL MEASURING INSTRUMENT

Filed Nov. 16, 1917

1,472,198

WITNESSES:
Ed. V. Herron
Fred H. Miller

INVENTOR
Harold B. Taylor
BY
Wesley G. Carr
ATTORNEY

Patented Oct. 30, 1923.

1,472,198

UNITED STATES PATENT OFFICE.

HAROLD B. TAYLOR, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed November 16, 1917. Serial No. 202,312.

*To all whom it may concern:*

Be it known that I, HAROLD B. TAYLOR, a citizen of the United States, and a resident of Wilkinsburg, in the county of Allegheny and State of Pennsylvania, have invented a new and useful Improvement in Electrical Measuring Instruments, of which the following is a specification.

My invention relates to measuring instruments and particularly to galvanometers of the unipivot type.

One object of my invention is to provide an instrument of the above-indicated character that shall be sensitive and protected from the detrimental effects of vibration.

Another object of my invention is to provide a unipivot galvanometer that shall have means for maintaining the axis of the movable element in alignment with its normal axis of rotation and that shall partially relieve the weight of the movable member on the pivot.

In practicing my invention, I provide a galvanometer having a centrally pivoted rotatable coil and magnetic means for holding the same in alignment with its normal axis of rotation to minimize the effects of vibration thereon.

Figure 1:
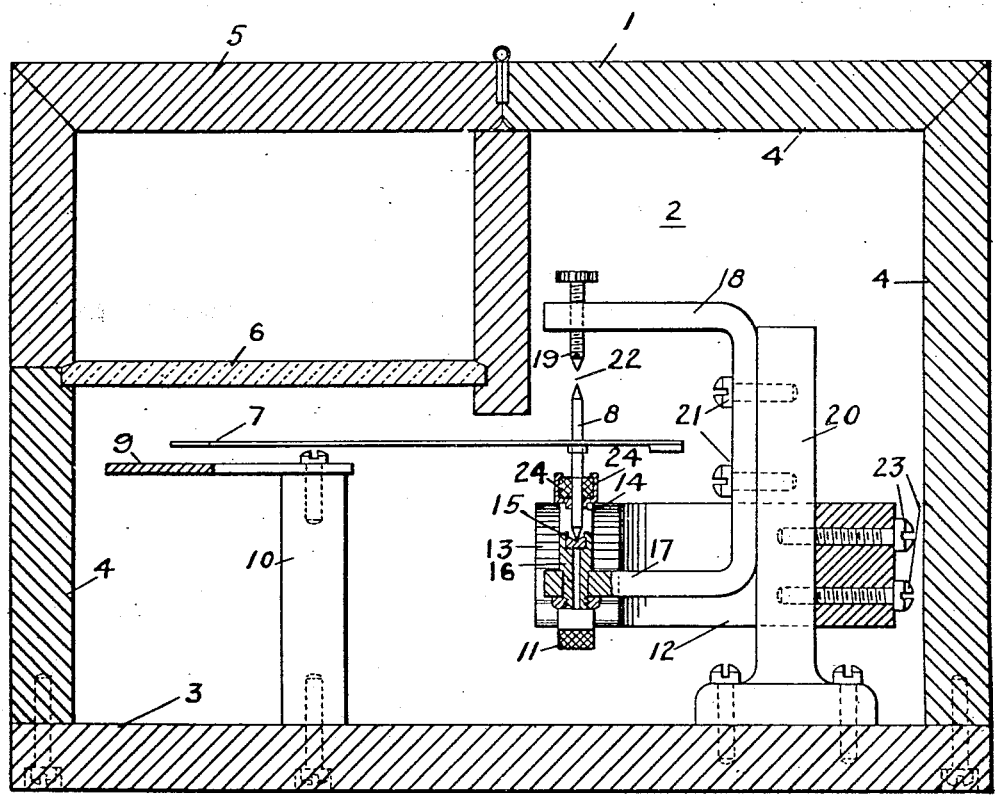
Figure 2:
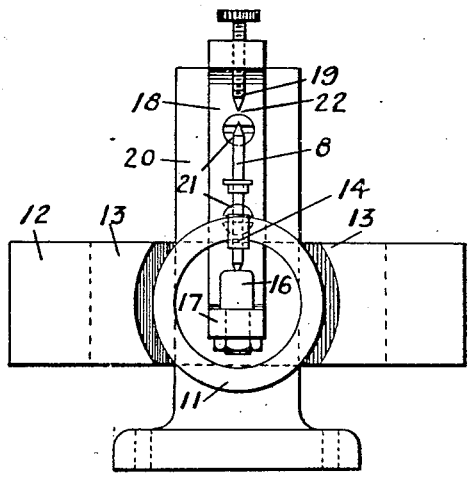

Figure 1 is a side view, partially in section and partially in elevation, of a galvanometer embodying my invention, and Fig. 2 is a front view of parts of the device shown in Fig. 1.

A casing 1, in which an instrument 2 is disposed, comprises a base plate 3, walls 4, a hinged cover member 5 and a window 6. A pointer 7, which is mounted on a shaft 8, of magnetizable material, such as iron or steel, co-operates with a scale plate 9 that is supported by a standard 10 on the base plate 3.

The shaft 8 extends through the upper portion of a circular coil 11, that is supported thereon by a member 14, and is adapted to move with the coil in the magnetic field produced by permanent magnet 12. The magnet 12 has pole members 13 and is mounted on a standard 20 by screws 23. The member 14 is held in position on the shaft 8 by projections 24 that embrace the upper portion of the coil 11.

The conically-tapered lower end of the shaft 8 engages, at substantially the center of the coil 2, a conically-recessed jewel-bearing member 15 which rests in the countersunk upper end of a bushing 16 of magnetizable material, such as iron on steel. The bushing 16 is mounted in a pole member 17 of an auxiliary permanent magnet 18 which is supported on the standard 20 by screws 21. The tapered upper end of the shaft 8 is aligned with a magnetizable conically-tapered screw 19 that is disposed in one end of the magnet 18. The tapered screw 19 constitutes an adjustable pole member for the magnet 18 and is adapted to vary the air gap 22 between its tapered end and the upper tapered end of the shaft 8. The variability of the air gap 22 permits regulation of the magnetic force with which the magnet 18 acts upon the shaft 8, thereby determining the degree of relief from the weight of the coil and shaft that the jewel-bearing member is given and the amount of restraint placed against displacement of the upper end of the shaft 8 from its normal vertical axis.

In addition to having all the advantages of a unipivot instrument, such as sensitiveness and absence of friction, there is obtained a readily portable device that is not easily put out of order by disturbing influences that are frequently met with in practice.

While I have shown and described a particular form of my invention, it is obvious that many changes may be made therein without departing from the spirit and scope of the same as set forth in the appended claims.

I claim as my invention:

1. In an instrument, the combination with a movable coil, means for supporting said coil above its center of gravity to balance the same in stable equilibrium and constituting a single bearing only therefor, of magnetic means for counteracting unbalancing influences thereon.

2. An instrument comprising a movable coil, means for balancing said coil in normally stable equilibrium with respect to a single point and constituting, at all times, the sole direct mechanical support for said coil, and magnetic means for counteracting unbalancing influences on said coil.

3. An instrument comprising a movable coil, means for balancing said coil in normally stable equilibrium with respect to a single point within the boundaries of and constituting, at all times, the sole direct support for said coil, and magnetic means for counteracting unbalancing influences on said coil.

4. An instrument comprising a movable coil disposed in a vertical plane, a meter-shaft structure having a magnetic upper end portion and extending radially with respect to the coil in the plane thereof between points inside and outside the coil, a single bearing supporting the lower end of the shaft structure above the center of gravity of the coil and magnetic means spaced from the upper end of the shaft structure and affecting the same to counteract unbalancing influences thereon.

5. An instrument comprising a movable element, a vertical magnetic shaft therefor supported only at its lower end above the center of gravity of the element and means constituting a magnetic path extending from a position adjacent to the lower end of the shaft to a position spaced from the upper end thereof.

In testimony whereof, I have hereunto subscribed my name this 18th day of Oct. 1917.

HAROLD B. TAYLOR.